(12) United States Patent
Grubisic et al.

(10) Patent No.: US 11,086,626 B2
(45) Date of Patent: Aug. 10, 2021

(54) CIRCUITRY AND METHODS

(71) Applicant: Arm Limited, Cambridge (GB)

(72) Inventors: Roko Grubisic, Fulbourn (GB);
Giacomo Gabrielli, Cambridge (GB);
Matthew James Horsnell, Cambridge (GB); Syed Ali Mustafa Zaidi, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/662,396

(22) Filed: Oct. 24, 2019

(65) Prior Publication Data

US 2021/0124585 A1   Apr. 29, 2021

(51) Int. Cl.
*G06F 9/34* (2018.01)
*G06F 9/38* (2018.01)
*G06F 9/30* (2018.01)
*G06F 8/41* (2018.01)

(52) U.S. Cl.
CPC ........ *G06F 9/30145* (2013.01); *G06F 9/3867* (2013.01); *G06F 8/433* (2013.01); *G06F 9/3824* (2013.01); *G06F 9/3838* (2013.01)

(58) Field of Classification Search
CPC .............. G06F 9/30145; G06F 9/3867; G06F 9/3016; G06F 9/30181; G06F 9/30185; G06F 9/30196; G06F 9/382; G06F 9/3826; G06F 9/3836; G06F 9/3838; G06F 9/34; G06F 9/3824; G06F 9/383; G06F 9/3012; G06F 9/30043; G06F 8/40; G06F 8/41; G06F 8/433
USPC ......... 712/226, 216–219, 213, 245; 717/136, 717/140, 145, 153
See application file for complete search history.

(56) References Cited

U.S. PATENT DOCUMENTS

| | | | | |
|---|---|---|---|---|
| 7,721,071 | B2* | 5/2010 | Jiang ................ | G06F 9/3826 712/217 |
| 2002/0138714 | A1* | 9/2002 | Leibholz ............ | G06F 9/3836 712/217 |
| 2005/0055533 | A1* | 3/2005 | Kadambi ........... | G06F 9/3842 712/1 |
| 2010/0332804 | A1* | 12/2010 | Golla ................ | G06F 9/3838 712/214 |

* cited by examiner

*Primary Examiner* — Daniel H Pan
(74) *Attorney, Agent, or Firm* — Nixon & Vanderhye P.C.

(57) ABSTRACT

Circuitry comprises decode circuitry to decode program instructions including producer instructions and consumer instructions, a consumer instruction requiring, as an input operand, a result generated by execution of a producer instruction; and execution circuitry to execute the program instructions; in which: the decode circuitry is configured to control operation of the execution circuitry in response to hint data associated with a given producer instruction and indicating, for the given producer instruction, a number of consumer instructions which require, as an input operand, a result generated by the given producer instruction.

13 Claims, 6 Drawing Sheets

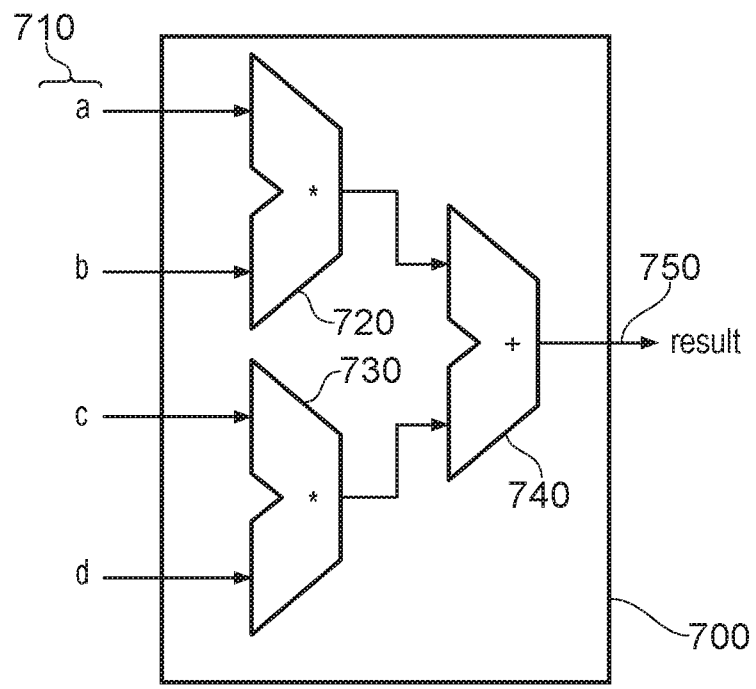
FIG. 7
MMA r4, r0, r1, r2, r3
FIG. 8
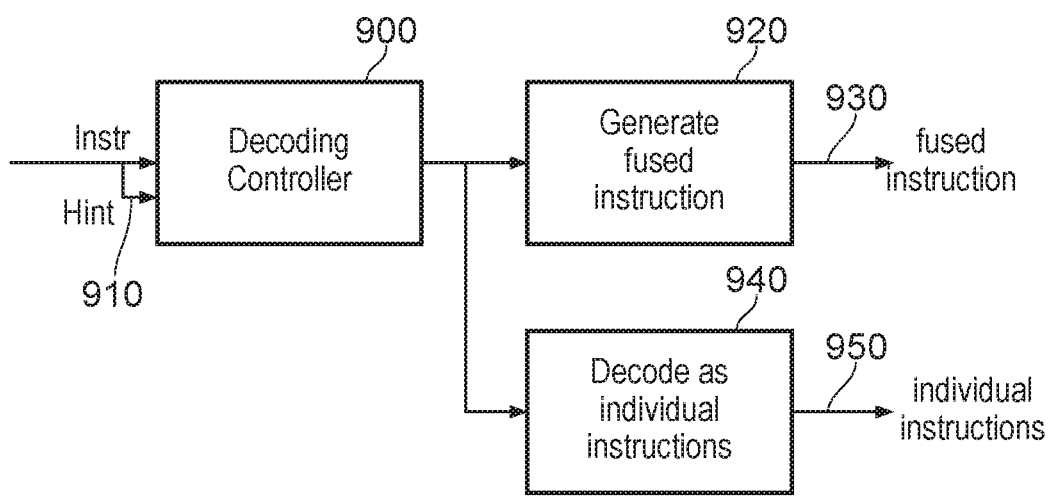
FIG. 9

CIRCUITRY AND METHODS

BACKGROUND

This disclosure relates to circuitry and methods.

In the operation of circuitry such as processor cores to execute program instructions, some program instructions (so-called consumer instructions) may have a dependency upon the results of others (so-called producer instructions). In some cases those execution results may be needed only once, and in some cases they may be needed (or potentially needed) by multiple instances of further subsequently executed instructions.

The present disclosure aims to provide improved techniques for handling such dependencies.

SUMMARY

In an example arrangement there is provided circuitry comprising:

decode circuitry to decode program instructions including producer instructions and consumer instructions, a consumer instruction requiring, as an input operand, a result generated by execution of a producer instruction; and execution circuitry to execute the program instructions; in which:

the decode circuitry is configured to control operation of the execution circuitry in response to hint data associated with a given producer instruction and indicating, for the given producer instruction, a number of consumer instructions which require, as an input operand, a result generated by the given producer instruction.

In another example arrangement there is provided a method comprising:

decoding program instructions including producer instructions and consumer instructions, a consumer instruction requiring, as an input operand, a result generated by execution of a producer instruction;

executing the program instructions; and controlling operation of the executing step in response to hint data associated with a given producer instruction and indicating, for the given producer instruction, a number of other instructions which require, as an input operand, a result generated by the given producer instruction.

In another example arrangement there is provided a computer-implemented method comprising:

compiling program source code into program object code comprising a set of machine-executable program instructions including producer instructions and consumer instructions, a consumer instruction requiring, as an input operand, a result generated by execution of a producer instruction; and associating hint data with a given producer instruction of the set of program instructions, the hint data indicating, for the given producer instruction, a number of other instructions which require, as an input operand, a result generated by the given producer instruction.

In another example arrangement there is provided a computer program comprising:

a set of machine-executable program instructions including producer instructions and consumer instructions, a consumer instruction requiring, as an input operand, a result generated by execution of a producer instruction; and hint data associated with at least a subset of the set of program instructions, the hint data associated with a given producer instruction of the set of program instructions indicating, for the given producer instruction, a number of other instructions which require, as an input operand, a result generated by the given producer instruction.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 7 schematically illustrates a fused instruction processor;

FIG. 8 schematically illustrates a fused instruction;

FIG. 9 schematically illustrates an example decoder;

DESCRIPTION OF EMBODIMENTS

Figure 1:
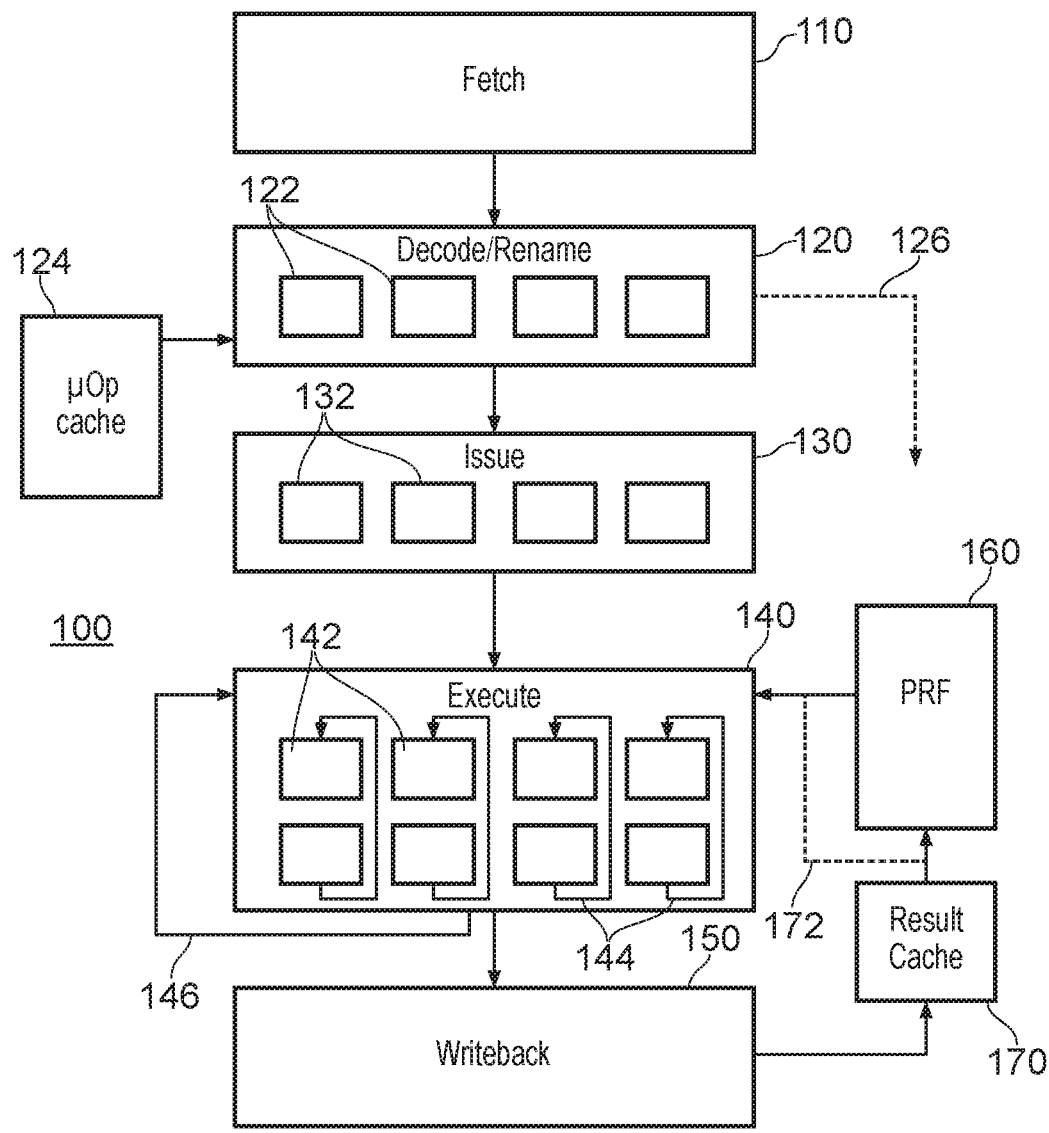
FIG. 1 schematically illustrates example circuitry.

Before discussing the embodiments with reference to the accompanying figures, the following description of embodiments is provided.

An example embodiment provides circuitry comprising decode circuitry to decode program instructions including producer instructions and consumer instructions, a consumer instruction requiring, as an input operand, a result generated by execution of a producer instruction; and execution circuitry to execute the program instructions; in which the decode circuitry is configured to control operation of the execution circuitry in response to hint data associated with a given producer instruction and indicating, for the given producer instruction, a number of consumer instructions which require, as an input operand, a result generated by the given producer instruction.

Example embodiments provide so-called hint data which can indicate (for example) whether an execution result is used a particular number of times such that it can either be discarded after those uses, or the instruction can be fused into a composite or complex instruction. This can provide information which may not otherwise be obtainable even by examination (for example by a decoder) of a current window of instructions.

Various uses may be made of the hint data. More than one of these example uses may be applied. In some examples, the execution circuitry comprises two or more execution pipelines and control circuitry to route a program instruction to a selected one of the two or more execution pipelines; and the control circuitry is configured to route a program instruction to an execution pipeline of the two or more execution pipelines in response to the hint data associated with that instruction or another instruction. For example, when the hint data indicates that only one consumer instruction requires, as an input operand, the result generated by the given producer instruction, the control circuitry is configured to route that one consumer instruction and the given producer instruction to the same execution pipeline (and otherwise the instructions may be routed to different pipelines or to the same pipeline). This arrangement allows so-called local forwarding of execution results, an efficient and potentially low cost procedure, to be used, in that the execution circuitry may comprise communication circuitry to communicate a result of execution by one of the execution pipelines to one or more other of the execution pipelines for use as an execution input, in which: when the hint data indicates that only one consumer instruction requires, as an input operand, the result generated by the given producer instruction, the communication circuitry is configured to communicate the result of execution of the given producer instruction only to that one of the execution pipelines to which the one consumer instruction is routed.

In other approaches (which may be used instead or as well as the above examples), the execution circuitry comprises result storage to store the result of execution of a program instruction; and the execution circuitry is configured to vary the storage of the result of execution of a given producer instruction in response to the hint data associated with the given producer instruction. For example, the result storage may comprise a physical register file; and the execution circuitry may be configured to selectively inhibit writing of the result of execution of a given producer instruction to the physical register file in response to the hint data associated with the given producer instruction. As an example, the execution circuitry may be configured to selectively inhibit writing of the result of execution of a given producer instruction to the physical register file in response to initiation of execution of the number of consumer instructions defined by the hint data for the given producer instruction and which require, as an input operand, the result generated by the given producer instruction. In other examples, the result storage comprises a result cache; and the execution circuitry may be configured to control retention in the result cache of the result of execution of the given producer instruction in response to the hint data associated with the given producer instruction.

In examples, the execution circuitry may be configured to control retention in the result cache of the result of execution of a given producer instruction at least until execution has been initiated for the number of consumer instructions defined by the hint data for the given producer instruction and which require, as an input operand, a result generated by the given producer instruction, so as conveniently to assist in re-use of that result.

Hint data of the type discussed above is also relevant to a technique to be referred to as so-called instruction fusion, for example in which the execution circuitry comprises processing circuitry to execute a function equivalent to the operation of a predetermined group of program instructions; and the decoder circuitry is configured to detect, in the set of program instructions, the predetermined group of program instructions and, in response to the hint data associated with at least one of the detected program instructions, to initiate execution by the execution circuitry of the function equivalent to the detected group of program instructions. Here, the hint data can be used to steer a decision as to whether a set of instructions can be fused, or whether any intermediate result would or could still be required by another later instruction. In particular examples of this technique, the decoder circuitry may be configured to initiate execution of the function equivalent to the detected group of program instructions when the hint data associated with at least one of the detected group of program instructions indicates that at least one intermediate result of the detected group of program instructions has no consumer instructions other than instructions within the detected group of program instructions.

In examples, the hint data comprises n-bit hint data, where n is at least one, the n-bit hint data selectively representing at least one hint state for the given producer instruction in which a predetermined number of other instructions require, as an input operand, a result generated by the given producer instruction. For example, in an n=1 system, the hint data can indicate "a result is discardable after a single reference or use by a consumer instruction" or "a result may be needed by other instructions" to assist handling at execution. For example, the predetermined number of other instructions may comprise one other instruction.

Although the hint data could be represented by, for example, a separate hint data word or representation, for example providing respective hint data relevant to multiple instructions, in a convenient example the hint data may be embedded in an instruction, for example in which each instruction is represented by an m-bit operation code defining at least an instruction operation, zero or more input operands and zero or more destination operands; and the hint data is represented by one or more bits of the m-bit operation code.

Another example embodiment provides a method comprising decoding program instructions including producer instructions and consumer instructions, a consumer instruction requiring, as an input operand, a result generated by execution of a producer instruction; executing the program instructions; and controlling operation of the executing step in response to hint data associated with a given producer instruction and indicating, for the given producer instruction, a number of other instructions which require, as an input operand, a result generated by the given producer instruction.

Another example embodiment provides a computer-implemented method comprising compiling program source code into program object code comprising a set of machine-executable program instructions including producer instructions and consumer instructions, a consumer instruction requiring, as an input operand, a result generated by execution of a producer instruction; and associating hint data with a given producer instruction of the set of program instructions, the hint data indicating, for the given producer instruction, a number of other instructions which require, as an input operand, a result generated by the given producer instruction.

The above method may be implemented as an embodiment of the present disclosure as a non-transitory machine-readable storage medium which stores a computer program which, when executed by a computer, causes the computer to implement such a method.

Another example embodiment provides a computer program product comprising a set of machine-executable program instructions including producer instructions and consumer instructions, a consumer instruction requiring, as an input operand, a result generated by execution of a producer instruction; and hint data associated with at least a subset of the set of program instructions, the hint data associated with a given producer instruction of the set of program instructions indicating, for the given producer instruction, a number of other instructions which require, as an input operand, a result generated by the given producer instruction.

The above computer program product may be implemented, as an embodiment of the present disclosure, as a non-transitory machine-readable storage medium which stores such a computer program product.

Referring now to the drawings, example embodiments of the present disclosure involving the use of so-called hint data have various types of technical use and implementation. Two example arrangements that will be described here relate to the handling of data within a processor core such as a so-called out-of-order (OOO) processor core, and the fusion of instructions.

Data Handling in a Processor Core

FIG. 1 schematically illustrates example circuitry 100, and in particular provides a generic representation of a processor core such as an OOO processor core, including a fetch stage 110, a decode/rename stage 120, an instruction issue stage 130, an execute stage 140 and a writeback stage 150.

In general terms, instructions are fetched from memory (for example via a cache memory) (not shown) by the fetch stage 110. The instructions are decoded for execution by the decode/rename stage 120 which may include multiple decode pipelines 122 operating in parallel. With reference to renaming refers to the allocation, which can occur in OOO processors, of architectural registers to a larger number of physical registers in a physical register file (PRF) 160. The renaming of architectural registers to physical registers allows instructions to be executed out of order, as long as a suitable record is maintained, for example in a so-called re-order buffer (ROB) (not shown) of (a) the renaming itself, and (b) how the execution of one particular instruction depends upon the results of instructions which are earlier in the program code order, so that the dependent instruction can be issued for execution in response to the relevant execution results being ready.

In general terms, an instruction which generates a result value which is needed by another instruction later in the program code order will be referred to as a "producer" instruction, and the instruction later in the program code order which relies on those result values will be referred to as a "consumer" instruction. Generally speaking, a consumer instruction is not issued for execution until it becomes apparent, for example by monitoring the progress of the producer instruction(s) that the results of the producer instruction will be ready at least by the time the consumer instruction reaches execution.

As part of the operation of the decode/rename stage 120, decoded instructions may be mapped to sets of so-called micro operations held in a micro operation (μOp) cache 124. The issue stage 130 may provide multiple issue queues 132 and the execute stage may similarly provide multiple execute pipelines 142.

Communication of Execution Results to Subsequently Executed Instructions

In FIG. 1, there are three general ways of communicating a result value generated by one of the execute pipelines 142 in the execution of a producer instruction so that the particular result value is available for use by a subsequently executed consumer instruction. These communication paths are each shown schematically in FIG. 1.

In a first example, so-called "local forwarding" involves a communication path from the output of an execute pipeline 142 to the input of the same execute pipeline. Local forwarding paths are shown schematically as paths 144 in FIG. 1.

A second option is so-called "broadcast forwarding" in which the output of each of the execute pipelines is provided as a broadcast input, by an example data communication path 146, to each of the execute pipelines.

A third communication path involves the use of the writeback stage 150 in that the result of execution is written back to the physical register file 160, in particular to a physical register specified by the decode/rename stage 120, possibly via a result cache 170 which can provide a temporary storage of results which would otherwise be written back to the physical register file such that, via a schematic path 172, they can be provided back to the execute stage 140 without actual writing and reading from the physical register file 160.

The various communication paths shown in FIG. 1 may be considered as being ranked in terms of efficiency and also "cost" in terms of processing overhead. In particular, local forwarding 144 is considered the most efficient and least cost. Broadcast forwarding 146 is next in terms of efficiency and cost, and writing back to the physical register file 160 is considered the least efficient and highest cost of the different options.

Example embodiments of the present disclosure aim to allow the increase of the use of local forwarding which can potentially improve the efficiency of operation of a processor or processor core.

Finally with reference to FIG. 1, the decode/rename stage 120 can provide various control signals or indications 126 to control certain operations of other parts of the circuitry of FIG. 1 using techniques to be described below. For example, aspects of the operation of the issue and/or execution of instructions, and/or aspects of the routing of execution results to (or the retention in) the results cache and/or the physical register file can be controlled in response to so-called hint data associated with one or more of the instructions to be executed.

In this way, the arrangement of FIG. 1 provides an example of decode circuitry 120 to decode program instructions including producer instructions and consumer instructions, a consumer instruction requiring, as an input operand, a result generated by execution of a producer instruction; and execution circuitry 140, 150, 170, 160 to execute the program instructions; in which: the decode circuitry is configured to control operation of the execution circuitry in response to hint data associated with a given producer instruction and indicating, for the given producer instruction, a number of consumer instructions which require, as an input operand, a result generated by the given producer instruction.

Examples of Hint Data

Figure 2:
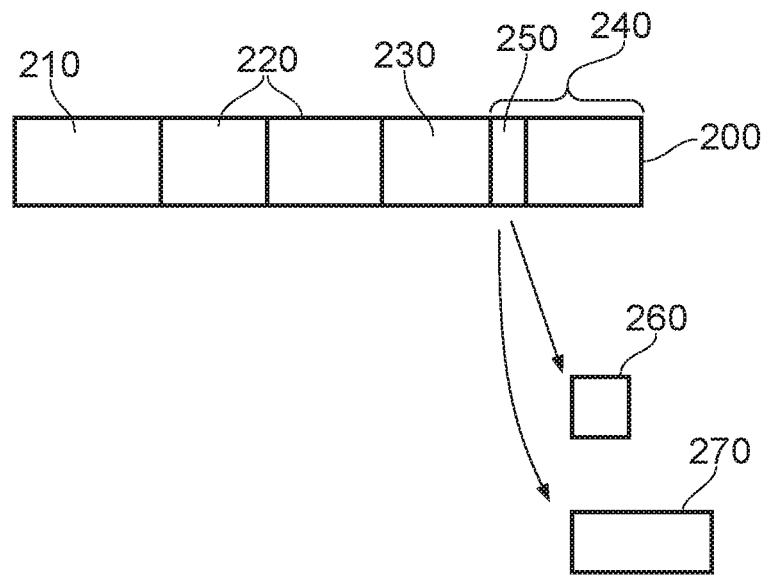
FIG. 2 schematically illustrates a data processing instruction.

FIG. 2 schematically illustrates a data processing instruction.

It is noted that a particular instruction format is not a technical requirement of the embodiments of the present disclosure, but an example format will now be described in order to allow various techniques to be discussed.

The example instruction 200 of FIG. 2 represents an example 32 bit instruction word. This can provide an "opcode" (operation code) portion 210 indicating or identifying the particular instruction type within the available instruction set, further portions 220 specifying input operands and a portion 230 specifying an output operand. Many instructions refer to a pair of input operands and a single output operand, for example each using 5 bits. Within a remaining portion 240 of the 32 bit word, some bits may be occupied by data specifying particular variants of the functionality of the specified instruction, but also so-called hint data 250 may be provided.

This therefore provides an example in which each instruction is represented by an m-bit operation code defining at least an instruction operation, zero or more input operands and zero or more destination operands; and the hint data is represented by one or more bits of the m-bit operation code.

In some examples, the hint data may be represented by one bit 260 or, in the relatively unusual situation where the instruction specifies more than one output or destination operand, one bit per destination operand, or in other examples a set of two or more bits 270 may be used (or 2 or more bits per destination operand for a multiple output instruction).

The hint data is referred to in this manner because it provides information which can be used by a processor to improve or in some cases render more efficient the operation of the processor, but it does not have to be so used. Indeed, the processor could ignore the hint data and still operate successfully and adequately. This feature of the hint data means that, for example, more advanced processor cores can provide functionality which makes use of the hint data, whereas lower power or lower functionality processing cores still compatible with the same instruction set can simply ignore the hint data (for example, by writing back to the physical register file and/or using potentially less efficient results routing even when the hint data might have indicated that a more efficient technique could be used instead) and yet still proceed to execute instructions of that instruction set.

Figure 3:
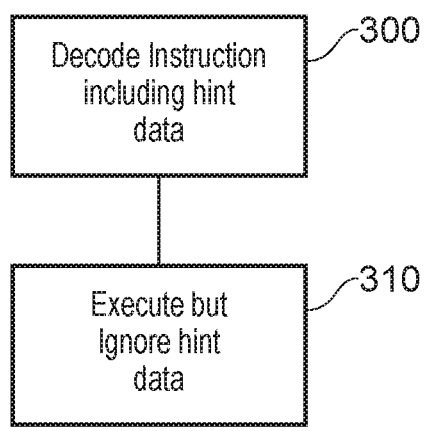
FIGS. 3 and 4 are schematic flowcharts illustrating respective methods.
Figure 4:
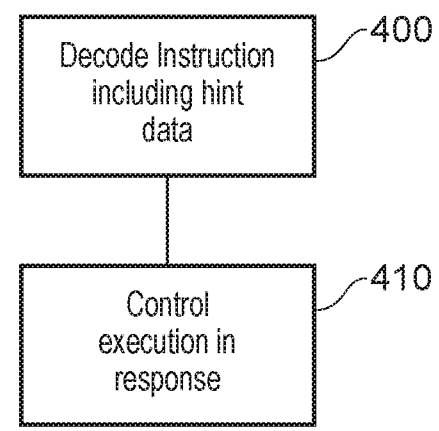

These different approaches are summaries in schematic flowcharts of FIGS. 3 and 4.

In FIG. 3, a processor core such as a lower power or lower functionality core decodes (at a step 300) instructions including the hint data, but at a step 310 the hint data is ignored but the instructions are still executed.

In contrast, with reference to a processor capable of making use of the hint data (using techniques to be described below), again at a step 400 instructions are decoded which includes the hint data, but in contrast to FIG. 3, at a step 410 the execution of those instructions is at least partially in response to the detected hint data.

Figures 5, 6:
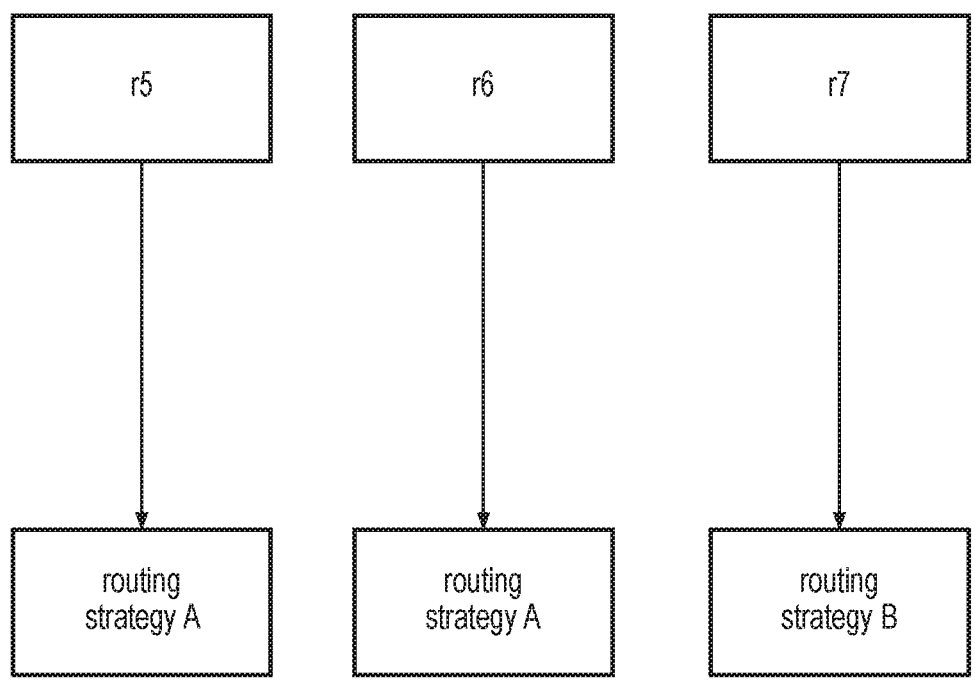
FIG. 5 schematically illustrates a set of processing instructions forming an example computer program.
FIG. 6 schematically illustrates a set of routing strategies.

FIG. 5 schematically illustrates a set of data processing instructions forming at least a part of an example computer program. In practice of course, a typical computer program would have more than 3 instructions, but other instructions are omitted for clarity of the diagram.

In FIG. 5, each instruction 500 is shown with associated hint data 510.

A first instruction 520 is a multiply instruction to generate the product:

$$r5=r0*r1.$$

A second instruction again is a multiply instruction to provide the function:

$$r6=r2*r3.$$

A third instruction 540 is an addition instruction to generate the sum:

$$r7=r5+r6.$$

Therefore, the overall effect of the three instructions 520 . . . 540 is to generate the composite result:

$$r7=(r0*r1)+(r2*r3) \quad \text{(Eqn. 1)}$$

In the context of the composite operation Eqn. 1, the results placed in the registers r5 and r6 are needed only for the purposes of the addition instruction 540 and, in this particular example, are not used for any other purposes. This situation could arise, for example, in the context of a compiler breaking down the composite equation specified above into the three component instructions 520, 530, 540 for the purposes of compilation of source code. This would imply that the compiler has full knowledge that the intermediate results r5, r6 were created only for the purposes of creating the result in r7. Therefore, the hint data associated with the instructions 520, 530 is indicated in FIG. 5 as "RD" (result discardable), and the hint data associated with the instruction 540, with reference to the operand r7, is "ND" (not discardable). In other words, the result r7 may go on to be used elsewhere, whereas the results r5 and r6 are needed only for a single instruction 540 after which they can be discarded.

Note that the term "not discardable" as used here does not imply "never discardable" but rather that (in this one-bit hint data example) that the data is not classified as being single-use, such that it is not immediately discardable after use by a single consumer instruction.

This hint data can affect the routing and/or storage of the output operands r5 and r6 within the circuitry of FIG. 1.

Indeed, as represented schematically by FIG. 6, different routing strategies (routing strategy A or routing strategy B) can be applied to r5/r6 and to r7 in response to the hint data and under the control of the control information 126 provided by the decoder.

The example hint data 510 or FIG. 5 may be represented by one-bit hint data, so that of the two options available in a one-bit flag, "RD" may indicate that a particular result is for use by only one consumer instruction, whereas "ND" indicates that a particular result may (at least potentially) be used by multiple consumer instructions. Other multi-bit examples will be discussed below.

FIG. 5 therefore provides an example of a computer program comprising:

a set of machine-executable program instructions 500 including producer instructions and consumer instructions, a consumer instruction requiring, as an input operand, a result generated by execution of a producer instruction; and hint data 510 associated with at least a subset of the set of program instructions, the hint data associated with a given producer instruction of the set of program instructions indicating, for the given producer instruction, a number of other instructions which require, as an input operand, a result generated by the given producer instruction.

In the example of FIG. 5, the hint data 510 comprises n-bit hint data, where n is at least one (n=1 in FIG. 5), the n-bit hint data selectively representing at least one hint state for the given producer instruction in which a predetermined number of other instructions require, as an input operand, a result generated by the given producer instruction. For example the predetermined number of other instructions may comprise one other instruction.

The program of FIG. 5 may be stored by a non-transitory machine-readable medium such as a medium 1120 to be described below.

Handling Example 1

When the decode/rename stage 120 detects "RD" hint data indicating a single consumer, that consumer instruction (which the decode/rename stage 120 can detect by its use of the output operands of the producer instructions as its source operands) is routed to the same issue queue 132 and from there to the same execute pipeline 142 as the result-discardable producer instruction(s). This allows the use of the local forwarding path 144 for the result discardable operands r5, r6 in the example of FIG. 5.

This therefore provides an example in which the execution circuitry comprises two or more execution pipelines and control circuitry to route a program instruction to a selected one of the two or more execution pipelines; and the control circuitry is configured to route a program instruction to an execution pipeline of the two or more execution pipelines in response to the hint data associated with that instruction or another instruction. For example, when the hint data indicates that only one consumer instruction requires, as an input operand, the result generated by the given producer instruction, the control circuitry is configured to route that one consumer instruction and the given producer instruction to the same execution pipeline.

In other similar examples, communication circuitry 144 is provided to communicate a result of execution by one of the execution pipelines to one or more other of the execution pipelines for use as an execution input, in which: when the hint data indicates that only one consumer instruction requires, as an input operand, the result generated by the given producer instruction, the communication circuitry is configured to communicate the result of execution of the given producer instruction only to that one of the execution pipelines to which the one consumer instruction is routed.

Handling Example 2

Disable writeback to the physical register file 160 of output operands hints data "RD", forcing the use of local forwarding and/or broadcast forwarding for those operands.

Handling Example 3

Prioritise storage and/or retention in the result cache 170 of output operands having hint data "ND", as these are more likely to be reused by multiple consumer instructions than operands having hint data "RD".

Handling examples 2 and 3 provide examples in which the execution circuitry comprises result storage to store the result of execution of a program instruction; and the execution circuitry is configured to vary the storage of the result of execution of a given producer instruction in response to the hint data associated with the given producer instruction. For example, the result storage may comprise a physical register file; and the execution circuitry may be configured (in Handling example 2) to selectively inhibit writing of the result of execution of a given producer instruction to the physical register file in response to the hint data associated with the given producer instruction. Similarly, for example, the execution circuitry may be configured to selectively inhibit writing of the result of execution of a given producer instruction to the physical register file in response to initiation of execution of the number of consumer instructions defined by the hint data for the given producer instruction and which require, as an input operand, the result generated by the given producer instruction. With reference to Handling example 3, the result storage may comprise a result cache; and the execution circuitry may be configured to control retention in the result cache of the result of execution of the given producer instruction in response to the hint data associated with the given producer instruction. For example, the execution circuitry may be configured to control retention in the result cache of the result of execution of a given producer instruction at least until execution has been initiated for the number of consumer instructions defined by the hint data for the given producer instruction and which require, as an input operand, a result generated by the given producer instruction.

Comparative Handling Example

The handling examples provided above represent the step 410 of FIG. 4. As a comparison, in respect of the step 310 of FIG. 3, a legacy or lower functionality processor which is incapable of using the hint data would simply apply routing and/or execution and/or storage parameters derived using established techniques while ignoring the hint data. It is noted that this could involve potential inefficiencies (or at least relative inefficiencies) in that execution results flagged as "RD" may still be saved to the physical register file, for example, even though they are needed for only one other consumer instruction.

Example—Multiple Bit Hint Data

Referring back to FIG. 5, a 1-bit hint data example was provided. In other examples, a multiple bit hint data word could be provided. An example using two bits is shown in the following table:

| Hint bits | Specification | |
|---|---|---|
| 00 | Default/baseline | Absence of hint condition. Used for the default cases, where we have more than 3 consumers for a value, or the value's consumption distance is large. |
| 01 | 1 consumer | Specifying that no more than 1 consumer is expected. This is equivalent to the "results discardable" indication described above. |
| 10 | 2 consumers | Specifying that no more than 2 consumers are expected. |
| 11 | 3 consumers | Specifying that no more than 3 consumers are expected. |

Where the hint data specified a potential number of consumer 1, the decode/rename stage 120 can provide a counter (not shown in FIG. 1) to account the number of consumer instructions using a particular producer instruction's output, so as to detect when the result has been used as many times as it is going to be (as specified by the hint data) so that the result can then be discarded or at least not prioritised for storage or writeback to the physical register file 160.

Again, this provides an example where the hint data comprises n-bit hint data, where n is at least one, the n-bit hint data selectively representing at least one hint state for the given producer instruction in which a predetermined number of other instructions require, as an input operand, a result generated by the given producer instruction.

Example—Hint Data by Region

Instead of providing hint data on an instruction-by-instruction basis as a portion of the instruction word itself, hint data could instead be included for regions or blocks of a particular number n (for example, 16) instructions. For example, a block of 16 instructions could have a further 32 bit word encoded with it, for example prior to the beginning of the 16 instructions (in program flow order) such that for example, successive 2-bit portions of the 32-bit hint data word relate to respective instruction in the following region or group of 16 instructions.

In other examples, a portion of such an additional "hint data word" could be used to provide a dummy opcode which indicates that the remainder of the word provides hint data and which would be interpreted by a decoder incapable of using such hint data a NOP (no operation) opcode. For example, 4 bits could indicate the dummy opcode leaving 28 bits to represent hint data. In many instruction sets, spaces already reserved in the instruction set architecture for NOP codes of this nature.

Further Example—Fusion into "Macro Instructions" at Decode

One way of handling complex or composite formulae such as that described by Eqn. (1) above is for the processor hardware or circuitry to provide dedicated processing resources to handle such complex instructions. An example relevant to the arrangement of Eqn. (1) is shown schematically in FIG. 7, in which a processing block 700 which may be provided as part of the execute stage for example, and which takes 4 input operands 710, multiplies them in pairs using multipliers 720, 730, and adds the two intermediate results using an adder 740 to generate an output result 750.

An instruction relevant to the additional circuitry of FIG. 7 is not itself available in the instruction set architecture, but instead, where such circuitry is available, the decode/rename stage 120 detects a group of instructions of the form shown in FIG. 5 above and substitutes a single composite instruction such as that shown schematically in FIG. 8 as a "multiply-multiply-add" (MMA) "macro instruction" having 4 input operands r0 . . . r3 and one output operand r4. The decode/rename stage 120 generates the composite instructions and routes it to the circuitry 700 for execution.

This type of fusion of instructions is made more efficient or indeed possible in some circumstances by the use of hint data discussed above. In particular, in order to be sure a group of instructions such as that shown in FIG. 5 can be fused into the instruction of FIG. 8 it is necessary or at least useful for the decoder to know that the output operands of the instructions 520, 530 are required only by the consumer instruction 540 and not by other subsequent instructions.

FIG. 9 schematically illustrates an example of part of the operation of the decode/rename stage 120 to achieve this, in which a decoding controller 900 is responsive not only to the instruction stream but also to the hint data 910 associated with that instruction stream, to route the instructions either to circuitry 920 to generate a fused instruction 930, for example of the type shown in FIG. 8, or to decoding circuitry 940 to decode the instructions as individual instructions 950 for execution.

This provides an example in which the execution circuitry comprises processing circuitry to execute a function equivalent to the operation of a predetermined group of program instructions; and the decoder circuitry is configured to detect, in the set of program instructions, the predetermined group of program instructions and, in response to the hint data associated with at least one of the detected program instructions, to initiate execution by the execution circuitry of the function equivalent to the detected group of program instructions. For example, the decoder circuitry may be configured to initiate execution of the function equivalent to the detected group of program instructions when the hint data associated with at least one of the detected group of program instructions indicates that at least one intermediate result of the detected group of program instructions has no consumer instructions other than instructions within the detected group of program instructions.

Generation of Hint Data

The examples above relate to aspects of processors configured to make use of hint data where it is provided. Separately, the generation of hint data will now be described by way of example.

Figure 10:
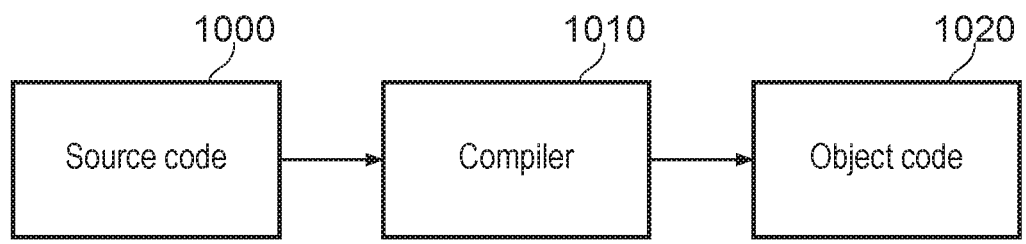
FIG. 10 schematically illustrates a compilation operation.

FIG. 10 schematically illustrates a compilation operation, in which source code 1000 is compiled by a compiler 1010 into object code 1020. The compiler may be implemented as a computer program project having computer program instructions to be executed by data processing apparatus such as that shown in FIG. 11.

Figure 11:
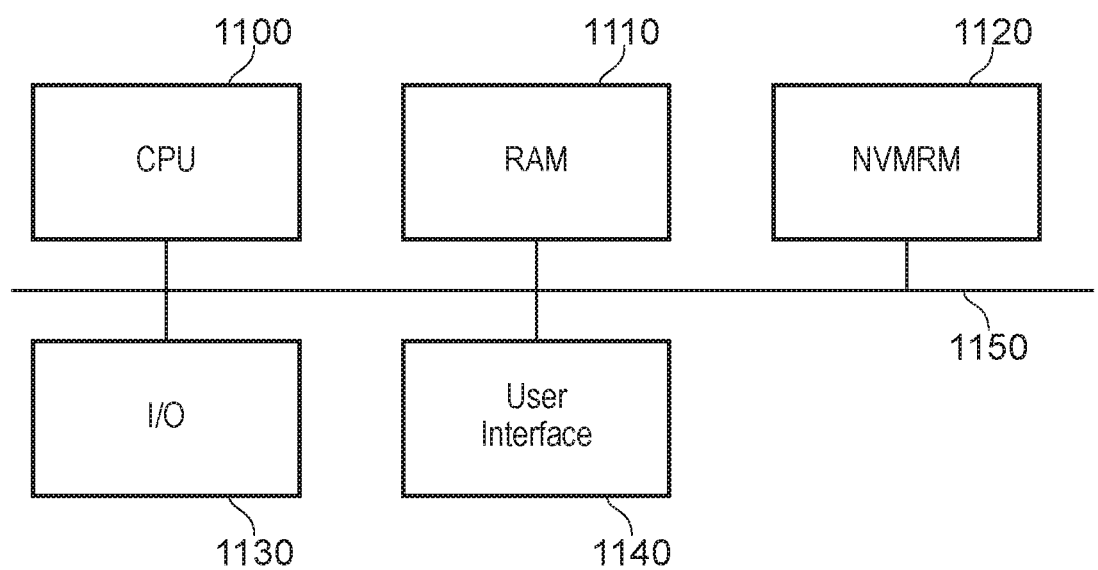
FIG. 11 schematically illustrates a data processing apparatus.

In FIG. 11, a processing unit (CPU) 1100, a random access memory (RAM) 1110, a non-volatile machine-readable (NVMRN) 1120 such as a hard disk, optical disk, flash memory or the like, input/output (I/O) circuitry 1130 user interface circuitry 1140 are all interconnected via bus structure 1150. In general terms, the CPU 1100 can execute instructions from the non-volatile machine readable 1120, for example by first copying those instructions into the RAM 1110 for execution. In this way, program instructions relating to the operation of the compiler 1010 can be executed, with, for example, the source code 1000 and the object code 1020 being held at least temporarily in the RAM 1110 during such operations.

Figures 12A, 12B:
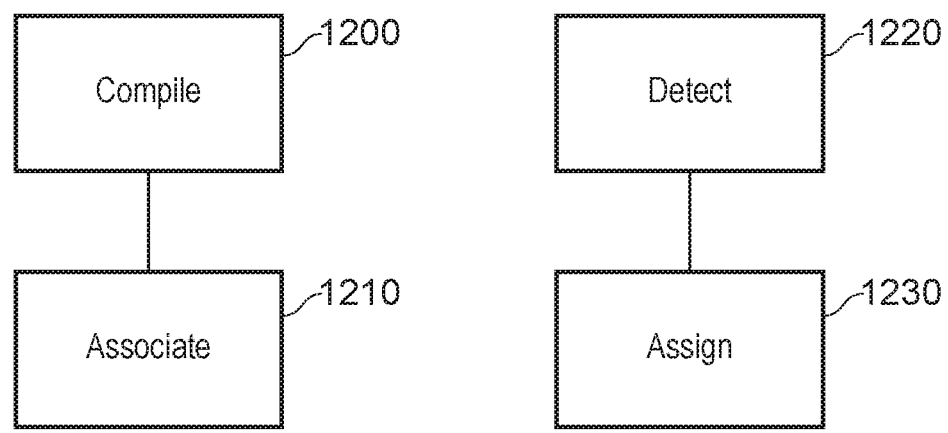
FIGS. 12*a* and 12*b* are schematic flowcharts illustrating respective methods.

FIGS. 12a and 12b are schematic flowcharts illustrating respective methods.

FIG. 12a is a schematic flowchart summarising the process at compilation time and representing a computer-implemented method comprising:

compiling (at a step 1200) program source code into program object code comprising a set of machine-executable program instructions including producer instructions and consumer instructions, a consumer instruction requiring, as an input operand, a result generated by execution of a producer instruction; and associating (at a step 1210) hint data with a given producer instruction of the set of program instructions, the hint data indicating, for the given producer instruction, a number of other instructions which require, as an input operand, a result generated by the given producer instruction.

As shown in FIG. 12b, the step 1210 discussed above may comprise, for example, detecting a sequence of instructions generated by the compilation stage 1200 (at a step 1220) in which the only use made of intermediate result operands is by a limited number (for example 1 in the case of one bit hint data, or more than 1 in the case of multiple bit hint data) subsequent consumer instructions, and assigning (at a step 1230) hint data to those producer instructions.

Further Example—Clustered Execution

Figure 13:
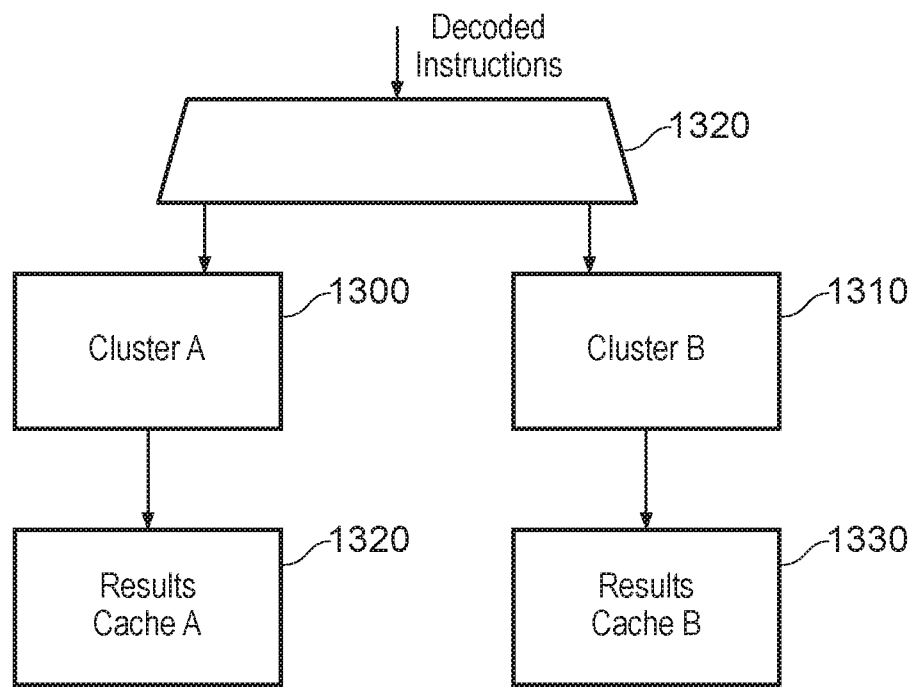
FIG. 13 schematically illustrates the use of execution clusters.

In some example processors, so-called clusters of execute pipelines are provided, so that instead of the single execute stage 140 of FIG. 1, the execute stage may be considered as separate respective clusters (FIG. 13) 1300, 1310 . . . . Instructions are routed to a respective cluster routing circuitry 1320, for example, under the control of the decode/rename stage 120. Each cluster may have multiple execute pipelines 142 of the type discussed above.

The use of clustering in this way introduces a further aspect to the communication of result operands to consumer instructions, in that each cluster may have a respective results cache 1320, 1330 . . . . Local forwarding and broadcast forwarding may take place within a cluster but not between clusters. And cluster-to-cluster communication can be particularly costly and require writing to the common physical register file.

This type of arrangement introduces a further aspect to the handling examples discussed above, which is that in the case of "RD" hint data, the producer and consumer instructions relevant to the single or limited use of the result of the producer instructions should be routed, for example under the control of the decode/rename stage 120, to a common cluster.

Summary Method

Figure 14:
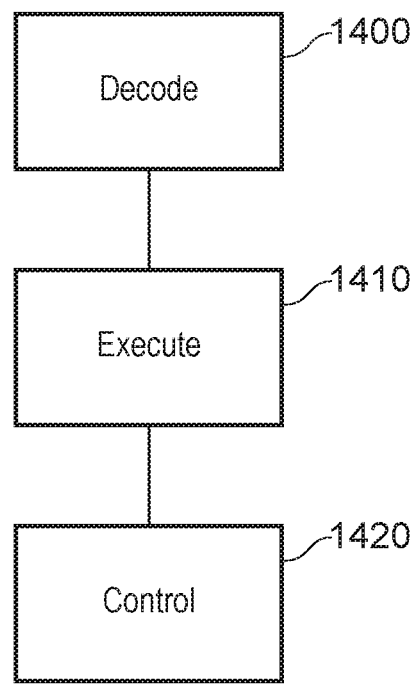
FIG. 14 is a schematic flowchart illustrating a method.

FIG. 14 is a schematic flowchart representing a method comprising:

decoding (at a step 1400) program instructions including producer instructions and consumer instructions, a consumer instruction requiring, as an input operand, a result generated by execution of a producer instruction;

executing (at a step 1410) the program instructions; and controlling (at a step 1420) operation of the executing step in response to hint data associated with a given producer instruction and indicating, for the given producer instruction, a number of other instructions which require, as an input operand, a result generated by the given producer instruction.

The steps 1400, 1410 and 1420 may be performed by circuitry such as that shown in FIG. 1, for example.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:

decode circuitry to decode program instructions including producer instructions and consumer instructions, a consumer instruction requiring, as an input operand, a result generated by execution of a producer instruction; and execution circuitry to execute the program instructions;

wherein:

the decode circuitry is configured to control operation of the execution circuitry in response to hint data associated with a given producer instruction and indicating, for the given producer instruction, a number of consumer instructions which require, as an input operand, a result generated by the given producer instruction;

the execution circuitry comprises two or more execution pipelines and a control circuitry to route a program instruction to a selected one of the two or more execution pipelines;

the control circuitry is configured to route a program instruction to an execution pipeline of the two or more execution pipelines in response to the hint data associated with that program instruction or another program instruction; and when the hint data indicates that only one consumer instruction requires, as an input operand, the result generated by the given producer instruction, the control circuitry is configured to route that one consumer instruction and the given producer instruction to the same execution pipeline.

2. The circuitry of claim 1, comprising communication circuitry to communicate a result of execution by one of the execution pipelines to one or more other of the execution pipelines for use as an execution input, in which:

when the hint data indicates that only one consumer instruction requires, as an input operand, the result generated by the given producer instruction, the communication circuitry is configured to communicate the result of execution of the given producer instruction only to that one of the execution pipelines to which the one consumer instruction is routed.

3. The circuitry of claim 1, in which:

the execution circuitry comprises result storage to store the result of execution of a program instruction; and the execution circuitry is configured to vary the storage of the result of execution of a given producer instruction in response to the hint data associated with the given producer instruction.

4. The circuitry of claim 3, in which:

the result storage comprises a physical register file; and the execution circuitry is configured to selectively inhibit writing of the result of execution of a given producer instruction to the physical register file in response to the hint data associated with the given producer instruction.

5. The circuitry of claim 4, in which:

the execution circuitry is configured to selectively inhibit writing of the result of execution of a given producer instruction to the physical register file in response to initiation of execution of the number of consumer instructions defined by the hint data for the given producer instruction and which require, as an input operand, the result generated by the given producer instruction.

6. The circuitry of claim 3, in which:

the result storage comprises a result cache; and the execution circuitry is configured to control retention in the result cache of the result of execution of the given producer instruction in response to the hint data associated with the given producer instruction.

7. The circuitry of claim 6, in which the execution circuitry is configured to control retention in the result cache of the result of execution of a given producer instruction at least until execution has been initiated for the number of consumer instructions defined by the hint data for the given producer instruction and which require, as an input operand, a result generated by the given producer instruction.

8. The circuitry of claim 1, in which:

the execution circuitry comprises processing circuitry to execute a function equivalent to the operation of a predetermined group of program instructions; and the decoder circuitry is configured to detect, in the set of program instructions, the predetermined group of program instructions and, in response to the hint data associated with at least one of the detected program instructions, to initiate execution by the execution circuitry of the function equivalent to the detected group of program instructions.

9. The circuitry of claim 8, in which the decoder circuitry is configured to initiate execution of the function equivalent to the detected group of program instructions when the hint data associated with at least one of the detected group of program instructions indicates that at least one intermediate result of the detected group of program instructions has no consumer instructions other than instructions within the detected group of program instructions.

10. The circuitry of claim 1, in which:
the hint data comprises n-bit hint data, where n is at least one, the n-bit hint data selectively representing at least one hint state for the given producer instruction in which a predetermined number of other instructions require, as an input operand, a result generated by the given producer instruction.

11. The circuitry of claim 10, in which the predetermined number of other instructions comprises one other instruction.

12. The circuitry of claim 1, in which:
each instruction is represented by an m-bit operation code defining at least an instruction operation, zero or more input operands and zero or more destination operands; and
the hint data is represented by one or more bits of the m-bit operation code.

13. A method comprising:
decoding program instructions including producer instructions and consumer instructions, a consumer instruction requiring, as an input operand, a result generated by execution of a producer instruction;
executing the program instructions by two or more execution pipelines; and
controlling operation of the executing step in response to hint data associated with a given producer instruction and indicating, for the given producer instruction, a number of other instructions which require, as an input operand, a result generated by the given producer instruction, wherein:
the executing step comprises routing a program instruction to a selected one of the two or more execution pipelines;
the routing is responsive to the hint data associated with that program instruction or another program instruction; and
when the hint data indicates that only one consumer instruction requires, as an input operand, the result generated by the given producer instruction, the routing comprises routing that one consumer instruction and the given producer instruction to the same execution pipeline.

* * * * *